United States Patent
Bornstein et al.

(10) Patent No.: US 6,818,252 B1
(45) Date of Patent: Nov. 16, 2004

(54) METHOD OF REDUCING CORROSION IN GAS TURBINE ENGINES

(75) Inventors: Norman Bornstein, West Hartford, CT (US); John P. Wesson, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 09/460,818

(22) Filed: Dec. 14, 1999

Related U.S. Application Data

(62) Division of application No. 08/996,653, filed on Dec. 23, 1997, now abandoned.

(51) Int. Cl.[7] .................................................. B05D 3/02

(52) U.S. Cl. ................................. 427/372.2; 427/419.2; 427/419.3

(58) Field of Search ........................... 427/372.2, 419.2, 427/419.3

(56) References Cited

U.S. PATENT DOCUMENTS

| | | | |
|---|---|---|---|
| 5,851,678 A | 12/1998 | Hasz et al. | 428/469 |
| 5,871,820 A | 2/1999 | Hasz et al. | 427/419.2 |

*Primary Examiner*—Bernard Pianalto

(57) ABSTRACT

A compressor coating is described which can reduce corrosion in the turbine system of a gas turbine engine. The coating is essentially not wet by droplets or aerosols of sea water or other corrodants. The coating reduces the build up of salt deposits on compressor components and their subsequent passage into the turbine section, thereby preventing severe localized corrosion which would otherwise occur.

5 Claims, No Drawings

METHOD OF REDUCING CORROSION IN GAS TURBINE ENGINES

This is a division of continuing application U.S. Ser. No. 08/996,653 filed on Dec. 23, 1997, abandoned.

BACKGROUND OF THE INVENTION

Gas turbine engines are widely used for aircraft power, to generate electricity, to power ships, and to pump fluids.

In general gas turbines consist of a compressor section, a combustor and a turbine section. In the compressor section air is compressed to a temperature which may be more than 1000° F. and a pressure which may be more than 300 psi. This heated compressed air is mixed with fuel and burned to produce hot gases which are expanded through a turbine which extracts energy. A portion of this extracted energy is used to power the compressor section but most of it is available for external uses.

The turbine section of the gas turbine engine is subject to many forms of deterioration. One form of deterioration is hot corrosion. Hot corrosion is a chemical attack of the turbine components. Hot corrosion usually involves a chemical attack by one or more compounds which contain one or more materials from the group comprising alkaline metals, vanadium and sulfur. These compounds attack the oxides which otherwise protects the superalloy turbine components from attack by oxygen. Hot corrosion generally occurs over the temperature range from 1300° to 2200° F.

Some of the ingredients which participate in hot corrosion, the previously mentioned alkaline metals, vanadium, and sulfur are often found in the fuel (particularly sulfur and vanadium) and some often come from the external atmosphere (alkaline elements). The external atmosphere is particularly conducive to hot corrosion when the engine is operated in a maritime environment and the atmosphere contains sea water in aerosol form.

It was previously generally believed that the sea water aerosl passed through the compressor without much affect and directly interacted into the turbine components to induce corrosion. It is now believed that while such flow through the compressor occurs, it is not directly responsible for most hot corrosion. Instead, it appears that the major contributor to turbine section hot corrosion by sea water aerosol particles results from a mechanism which includes the build up from salt on the later compressor stage blades and vanes and the subsequent flaking of the salt from the blades and vanes and its passage through the combustor and into the turbine as sizable solid particles. These sea salt particles adhere to the hot turbine component surfaces and cause accelerated localized corrosion. This adherence of concentrated sea salt particles on the turbine surfaces is apparently the most significant contributor to corrosion.

1. Field of the Invention

This invention relates to a coating for compressor components which reduce the build up of salt and thereby reduce turbine hot corrosion resulting from the passage of concentrated salt particles through the engine.

2. Description of Related Art

Applicants are unaware of any art which is truly related to this invention in as much as this theory is a new explanation for hot corrosion phenomenon in gas turbines. Prior attempts to reduce hot corrosion have focused on the materials used in the turbine section, the coatings and the underlying substrate materials. Efforts have been made to design coatings and substrate materials which have higher inherent corrosion resistance by adjusting the chemical composition. Applicants have no knowledge that anyone has attempted to reduce turbine hot corrosion by coating compressor component surfaces.

Accordingly it is an object of the present invention is to provide a coating for gas turbine compressor components which reduces the build up of salt on such components and thereby reduce hot corrosion in the turbine section. It is also an object of the invention to provide a method of applying such a non wetting coating of gas turbine compressor components.

SUMMARY OF THE INVENTION

According to the invention, gas turbine compressor blades, vanes and other hardware is coated with a thin adherent coating which is not appreciably wetted by sea water. Since the sea water wets the blade only minimally, it remains in the form of essentially spherical droplets rather than spreading out on the blade on the components as a sheet of liquid. This maintenance of the drop like geometry reduces the relative surface area of the sea water and reduces the deposition of salt onto the compressor component surfaces. Thus the droplets of sea water tend to pass directly through the engine without forming concentrated areas rich in sea salt on the turbine blades. The invention coating comprises a mixed glassy semi crystalline oxide coating consisting of 10–90% by vol. wherein the ratio of aluminum to zirconium is from 1:10 to 10:1.

DESCRIPTION OF PREFERRED EMBODIMENTS

According to the present invention a coating is applied to compressor hardware which has a wetting angle with respect to sea water in excess of about 50° and preferably in excess of about 60°.

The wetting angle or contact angle is measured as the angle from the surface through the liquid droplet to the tangent of the surface where the droplet contacts the solid surface. Low contact angles are observed in situations where a liquid wets a solid surface. High contact angles are characteristic of non wetting behavior. A contact angle of zero would imply complete wetting of the surface whereas a contact angle of 180° would indicate zero wetting. Surface angles can be measured optically by applying a drop of a liquid to a solid surface and measuring the angle using a magnifying optical system to assess the contact angle. Table I lists the contact angles for sea water in contact with a number of existing compressor surfaces, potential compressor component coatings, and the coating of the present invention.

It can be seen from the data in Table I that a typical compressor blade, in this case a blade having an aluminide surface, has a relatively low contact angle, about 25–40°. Applying a silica coating increases the contact angle slightly. A titania coating increases the contact angle even more. But the maximum observed contact angle even for titania is only about 43°. The invention coating which comprises an alumina-zirconia glass like coating exhibits the surface contact angle of 65–70°, significantly greater than that of any prior coating.

The angles presented in Table I were measured using water containing synthetic sea salt added to a result in a density of about 1.02 grams per millimeter which is representative of the concentration of sea salt found in most of the oceans of the world.

In the engine the temperature increases as the gas, passes through the compressor. As the temperature increases, the rate of evaporation increases. Rapid total evaporation would be predicted by equilibrium consideration at about 212° F. but does not occur because the flow velocity through the engine.

In a conventional engine having compressor components with low sea water wetting angles, compressor components with surface temperatures in excess of about 300° F. exhibit salt build up during continuous engine operation. The sea water drops impact and wet the heated surface and tend to stay resident on the blade, permitting evaporation to occur. The increased surface area of the thin wetted layer accelerates evaporation. The result is a build up of a thin layer of salt on the compressor components. In contrast, parts coated with the invention coating are not wet by the droplets and the residence time of the droplets is minimal so the sea salt build up is greatly reduced, if not eliminated.

It will be appreciated that the compressor components are operated under conditions of varying temperature and stress. These varying conditions, including factors such as vibration and aerodynamic forces, eventually cause the salt to break loose from the heated surface and to pass through the engine in concentrated form and to cause accelerated corrosion in the turbine section.

It is a part of our invention to reduce corrosion by reducing salt build up on the compressor in the compressor. Compressor salt build up is reduced according to the invention by using a non wetting coating. Increasing contact angles to angles greater than about 50° and preferably varying about 60° will contribute materially to reducing hot corrosion of turbine components.

Hot corrosion is a particular problem in industrial power plants because they operate at low altitudes. Operation in maritime or marine environments further exacerbates hot corrosion.

We believe that by providing a compressor coating which has a wetting angle with respect to salt water greater than about 50° and preferably greater than about 60°, that hot corrosion be substantially reduced.

We have found that a ceramic based coating containing both alumina and zirconia, in a combined or mixed oxide form, provides such a reduced wetting angle. Individual measurements of the wetting angle of alumina and zirconia suggests that neither alone as a wetting angle as high as that desired by the present invention. When mixed together and applied in a glass like form we have found that a mixed oxide of $Al_2O_3$ and $ZrO_2$ containing Zr in amounts of 10%–90% (of the total metal constituent of Al+Zr) provides the desired high wetting angles.

The invention coatings are preferably applied by providing appropriate sol-gel precursor material, applying this liquid sol-gel through the surface of the component to be coated, and then by heating the component to remove the water constituents leaving behind the mixed oxide.

Historically in the sol-gel art, in which many sol-gel solutions have been investigated, it has been difficult to apply an effective zirconia containing sol-gel. We have discovered two solutions which provide the desired combination of alumina and zirconia in sol-gel form. The operative sol-gel solutions are prepared by dissolving the zirconia containing compound in a concentrated acid as an initial step. Prior art sol-gel formulations have relied on dilute acids which were found to be unsatisfactory in the present invention. Concentrated acid is an acid having a pH less than 4 and preferably less than or equal to 2.5. The following two examples disclose the formulation of the sol-gel, the application of the sol-gel to a compressor component and the conversion of the applied sol-gel to a glassy ceramic coating.

EXAMPLE I

A mixture was prepared of 10.0 ml or Zr(Zirconium Butoxide)4 with 2.5 ml of dry i-propanol to lower viscosity of the mixture. The mixture was added dropwise to a solution of 12.5 ml nitric acid in 7.5 ml H2O stirred at 50–60 C. in a flask fitted with a reflux condenser. The mixture was diluted with 10.0 ml H2O and heated to 65–70 C. A mixture of 10.5 ml of aluminum butoxide was added dropwise to the Zr butoxide+nitric acid+isopropanol mixture. An additional 3.6 ml of nitric acid was added to stop precipitation of the metal oxides. The mixture was heated with stirring for about 4 hours at 65–70 C until a slightly cloudy sol-gel resulted. This solution was stable when stored in a closed bottle for a few weeks.

EXAMPLE II

A mixture was prepared of 7.4 ml of zirconium butoxide and 9.6 ml of aluminum butoxide with 5 ml of dry i-propanol to lower viscosity of the mixture. The mixture was added dropwise to a solution of 3 ml nitric acid in 3 ml H2O stirred at 70–75° C. in a flask fitted with a reflux condenser. The mixture was heated with stirring for about 4 hours until a slightly cloudy sol-gel resulted. This concentrate was slowly diluted with an additional 18 ml H2O while maintaining temperature above 70° C. This solution was stable when stored in a closed bottle for a few weeks.

It is difficult to ensure adherence of such a sol-gel produced coating to a metallic surface. We prefer to provide adherence by applying the sol-gel to a substrate which has a previously developed surface oxide of a stable element which is firmly adhered to the substrate material. The surface oxide may be comprised mainly of alumina, silica, and titania, and mixtures thereof. We have not had much success using chromia as a base oxide and we have had no success using iron oxide as a base oxide. We prefer to have a compressor component which has a stable adherent oxide from the class previously described having a thickness from about 0.05–5 and preferably 0.05–0.1 microns then applying one or more layers to sol-gel material followed by heating to a temperature in excess from about 500° C., optionally followed by a further application of sol-gel with associated by heating step. This provides a firmly adhered low wet ability coating for compressor hardware to substantially reduce turbine hot corrosion.

Although this invention has been shown and described with respect to the detailed embodiments thereof, it will be understood by those skilled in the art that various changes in the form and detail thereof may be made without departing from the spirit and scope of the claimed invention.

We claim:

1. A method of reducing corrosion in gas turbine engines including the step of: providing a coating on at least some compressor component surfaces to reduce wetting of said surfaces by aerosols; said coating exhibiting a contact angle of more than about 50° when wet by sea water, said coating having been applied over an intermediate stable oxide surface layer having a thickness of from about 0.05 to 0.5 microns.

2. A method as in claim 1 wherein the contact angle exceeds about 60°.

3. A method as in claim 1 wherein the coating comprises, at its surface, a mixed oxide of aluminum and zirconium in a semi-crystalline state.

4. A method as in claim 1 wherein said compressor component comprises a substrate made from an alloy based on an element selected from the group consisting of Ti, Ni, and Fe; and said substrate has an adherent stable oxide intermediate layer, wherein said stable oxide intermediate layer comprises an oxide selected from the group consisting of $Al_2O_3$, $SiO_2$, $TiO_2$, $Cr_2O_3$ and mixtures thereof and further includes up to about 20% of compounds based on elements contained in the substrate, and said oxide intermediate layer has on its surface a coating comprising a mixed oxide of aluminum and zirconium in a semi-crystalline state.

5. A method of applying a non porous coating comprising a mixed oxide of aluminum and zirconium to a metallic surface including the steps of:

a. producing an adherent layer of a stable oxide selected from the group consisting of $Al_2O_3$, $SiO_2$, $ZrO_2$, $Cr_2O_3$ and mixtures thereof, and further containing up to about 20% of compounds based on elements contained in the substrate on said metallic surface, and having a thickness of from about 0.05 to 0.5 microns;

b. coating said surface with a sol-gel composition containing $Al_2O_3$ and $ZrO_2$ precursors;

c. heating said sol-gel coated surface.

* * * * *